United States Patent
Liu et al.

(10) Patent No.: US 9,143,554 B2
(45) Date of Patent: Sep. 22, 2015

(54) CONTROL OF A COMPUTING SYSTEM HAVING ADJUSTABLE INPUTS

(75) Inventors: Xue Liu, Montreal (CA); Xiaoyun Zhu, Cupertino, CA (US); Zhikui Wang, Fremont, CA (US); Sharad Singhal, Belmont, CA (US); Ira Cohen, Reut (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 488 days.

(21) Appl. No.: 12/250,256

(22) Filed: Oct. 13, 2008

(65) Prior Publication Data

US 2010/0091786 A1    Apr. 15, 2010

(51) Int. Cl.
*H04L 12/28* (2006.01)
*H04L 29/08* (2006.01)
*H04J 1/16* (2006.01)

(52) U.S. Cl.
CPC ...................................... *H04L 67/10* (2013.01)

(58) Field of Classification Search
USPC .......................................... 370/252, 386, 419
See application file for complete search history.

(56) References Cited

U.S. PATENT DOCUMENTS

| | | | |
|---|---|---|---|
| 6,628,994 B1 * | 9/2003 | Turicchi et al. ................. 700/32 |
| 6,799,208 B1 * | 9/2004 | Sankaranarayan et al. ... 709/223 |
| 7,346,401 B2 * | 3/2008 | Diao et al. ...................... 700/28 |
| 8,417,715 B1 * | 4/2013 | Bruckhaus et al. ........... 707/758 |
| 2005/0049901 A1 * | 3/2005 | Diao et al. ........................ 705/7 |
| 2006/0047794 A1 * | 3/2006 | Jezierski ....................... 709/221 |
| 2011/0144807 A1 * | 6/2011 | Buda et al. .................... 700/275 |
| 2011/0261049 A1 * | 10/2011 | Cardno et al. ................. 345/419 |

OTHER PUBLICATIONS

Efron, B., et al.; Least Angular Regression; the Annals of Statistics 2004; vol. 32, No. 2, pp. 407-414.*
Magnus Karlsson et al., An Adaptive Optimal Controller for Non-Intrusive Performance Differentiation in Computing Services in International Conference on Control and Automation 2005 (ICCA '05), 2005, 6 pages.
X. Liu et al., Adaptive Entitlement Control of Resource Containers on Shared Servers, in 9th IEEE/IFIP International Symposium on Integrated Network Management (IM 2005), Nice, France, 2005, 14 pages.

* cited by examiner

*Primary Examiner* — John Pezzlo
(74) *Attorney, Agent, or Firm* — Trop, Pruner & Hu, P.C.

(57) ABSTRACT

A technique for controlling an output of a computing system having multiple adjustable inputs includes providing a set of adjustable inputs to the computing system, observing an output of the computing system while the system is in operation, and selecting a subset of adjustable inputs from the set of adjustable inputs based on the observation of the output. The inputs in the selected subset are then adjusted to achieve a desired output of the computing system.

16 Claims, 5 Drawing Sheets

CONTROL OF A COMPUTING SYSTEM HAVING ADJUSTABLE INPUTS

BACKGROUND

Today's information technology (IT) systems are large in scale and have an abundance of features, resulting in a large degree of complexity in their operation. Configuring application-level parameters (e.g., time-out limits, concurrent thread limits, etc.) and system-level parameters (e.g., resource allocation, I/O bandwidth, cache size, etc.) for these complex IT systems is a challenging task for IT operators. Current management products typically set these parameters statically via offline analysis and expose interfaces that allow experienced operators to change the parameter values if needed. However, statically set values are rarely ideal across a range of workloads. In addition, it is expensive and error-prone for human operators to decide appropriate values for these parameters to meet the performance metrics (e.g., transaction response time, throughput, etc.) or quality of service (QoS) targets of individual applications.

Because the workloads of Internet servers and enterprise applications fluctuate considerably, statically allocated resources generally are either under utilized or overloaded. To address this issue, IT systems and applications generally may expose interfaces to allow dynamic resource allocation or application configuration. However, it is often difficult to configure and adjust the relevant parameters properly for a number of reasons. For instance, there are often tens or hundreds of tunable parameters (or "knobs") that may be adjusted. Typically, only a subset of these parameters are critical to the application QoS for a given workload or under a certain operating condition. To identify in real time which knobs to tune is a nontrivial task due to the number of knobs and the complex interrelationships between the various knobs and the performance metrics. Thus, as the workload characteristics or system conditions vary over time, the key knobs that may affect performance metrics most may also change. In addition, the relationship between an application's performance metrics and its application-level configuration and system-level configuration is complex. As a result, it is challenging both to properly identify and adjust the most critical system-level or application-level parameters in response to changes in workloads or system conditions in order to meet application-level QoS targets.

BRIEF DESCRIPTION OF THE DRAWINGS

Some embodiments of the invention are described with respect to the following figures.

DETAILED DESCRIPTION

Figure 1:
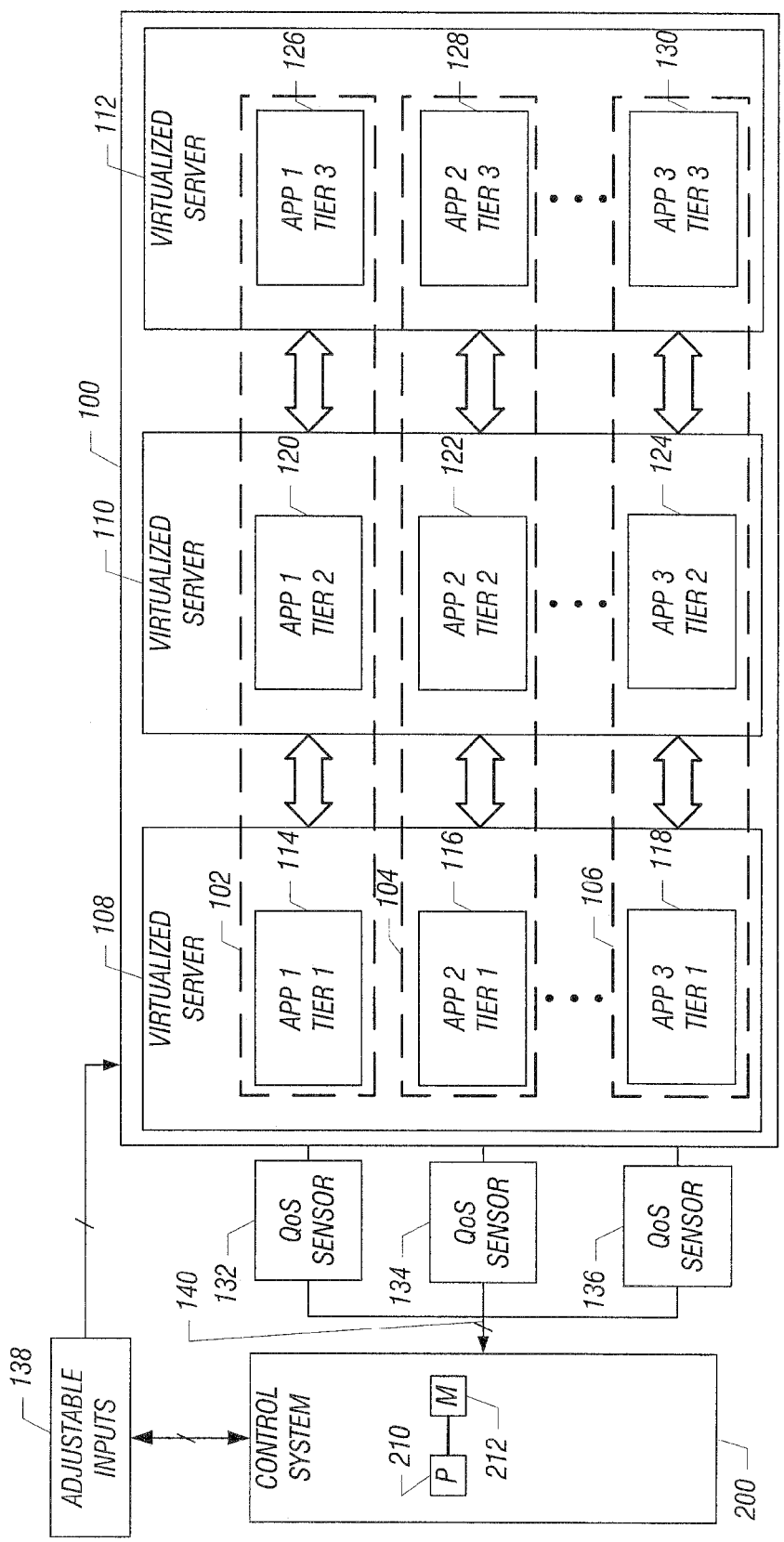
FIG. 1 is a block diagram of an exemplary computing system having an output controlled by a control system in accordance with an embodiment of the invention.

FIG. 1 illustrates an exemplary arrangement of a computing system 100, such as a complex information technology (IT) system, in which the control techniques and systems of the present invention may be implemented. In this example, computing system 100 is a shared hosting platform on which multiple distributed applications 102, 104, 106 share a common pool of virtualized physical servers 108, 110, 112. In the embodiment shown, each tier of each application is hosted inside a virtual container 114, 115, 118, 120, 122, 124, 126, 128, 130 residing on the virtualized physical servers 108, 110, 112 within the computing system 100. A virtual container may be a virtual machine provided by hypervisor-based technologies, such as Xen and VMware, or operating-system-level virtualization, such as OpenVZ and Linux VServer. Although FIG. 1 illustrates a specific example in which the same tiers from each of the different applications 102-106 are hosted on the same virtualized server 108, 110, 112, the arrangement or grouping of the application tiers may be different. Moreover, although the following description may make reference to the exemplary computing system 100 shown in FIG. 1, it should be understood that the control techniques and systems described herein may be implemented in any of a variety of computing environments having multiple adjustable application and system-level parameters that may be adjusted to affect the computing system's performance metrics.

Typically, in a shared hosting environment, such as the system 100 shown in FIG. 1, the IT provider offers quality of service (QoS) guarantees for the applications 102-106 hosted on the shared computing system 100. Maintaining the guaranteed QoS can be a challenging task since the resource demand of each application on the shared platform may vary depending on the number of concurrent users and the workload mix. As a result of these dynamic variables, a shared server may become saturated when the aggregate demand from all the application components sharing the server and its resources exceeds the total capacity, leading to a degraded QoS. As shown in FIG. 1, each application 102-106 may have an associated QoS sensor 132, 134, 136 to provide an indication of the QoS to the IT operator.

Known control systems have the capability to dynamically allocate resources that are shared in a computing system, such as processor, memory, and I/O resources. For instance, dynamic allocation of resources may be performed by taking advantage of the resource scheduler interfaces that are exposed by the virtualization layer in a virtual computing system environment. Such dynamic allocation schemes typically are relatively straightforward to implement where the system has a small number of physical nodes (N) and virtual containers per node (M), and only a few shared resources that may present bottlenecks. However, more typically, complex computing systems have a large number (N) of physical nodes and a large number (M) of virtual containers per node, and many resources (R) that may present bottlenecks. Thus, there are a corresponding large number (i.e., N*M*R) of potential knobs that may be adjusted to attain a desired QoS. This large number of possible knob presents difficulties in designing an appropriate control system.

As used herein, the "knobs" for a computing system are viewed as "adjustable inputs" to the computing system. In a complex computing system, such as that illustrated in FIG. 1, knobs or adjustable inputs 138 may be application-level parameters and/or system-level parameters. Application-level knobs may include, for example, time-out limits, the number of threads running concurrently, etc. System-level knobs may include, for example, allocation of shared resources, such as processor or memory resources, allocation of I/O bandwidth, and cache size specifications. These knobs all may affect the performance metrics of the computing system. Moreover, the manner in which the performance metrics are affected by adjustments of the knobs may vary depending on the workload and/or operating conditions of the computing system. As used herein, performance metrics are collectively viewed as an "output" of the computing system (such as output 140 in FIG. 1) and may include, for example, application response time, throughput, resource utilization, etc. from the different applications 102, 104, 106.

In an embodiment of the invention, to facilitate implementation of a control system for achieving desired performance metrics (i.e., output 140) for a complex computing system having a large number of adjustable inputs 138, the dimensions of the system 100 may be reduced by identifying and selecting, while online, a subset of the knobs 138 that may be considered. The settings of the selected knobs are then adjusted to achieve the desired output 140. In one embodiment of the invention, the control knobs 138 that are included in the identified subset are those knobs which have the most influence on the performance metrics 140.

Figure 2:
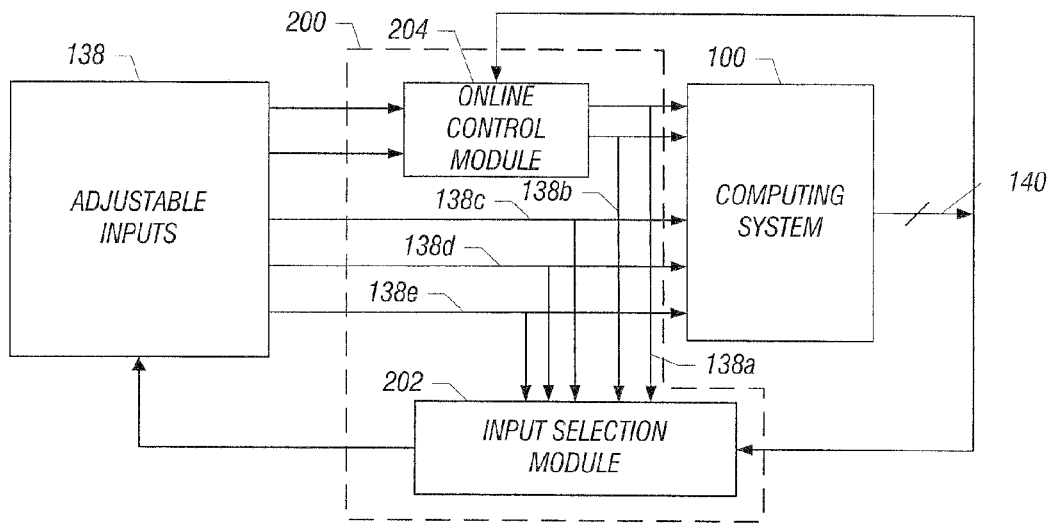
FIG. 2 is a block diagram of an exemplary architecture of the control system of FIG. 1, in accordance with an embodiment of the invention.

An exemplary architecture of a control system 200 using dynamic dimension reduction and control to adjust the inputs to the computing system 100 is illustrated in FIG. 2. In the example shown in FIG. 2, the computing system 100 has multiple adjustable inputs 138 that influence the output 140 of the system 100. The arrangement shown in FIG. 2 is a closed loop system, in that the selection and adjustment of inputs 138 to the computing system 100 to affect the performance metrics of system 100 are determined based on observing simultaneously the inputs 138 and the output 140 of system 100.

More specifically, as shown in FIG. 2, the control system 200 includes an input selection module 202 and an online controller module 204. Multiple tuning knobs 138, such as the five tuning knobs 138a-e shown in FIG. 2, are provided as inputs to the computing system 100. Each of these tuning knobs may variously affect the output 140 of the system 100. Both the tuning knobs 138 and the performance metrics 140 are provided as inputs to the input selection module 202. Based on the performance metrics 140 observed by the input selection module 202 while the system 100 is online, the input selection module 202 selects a subset of the tuning knobs 138 that most affect the metrics that require adjustment. Selection of the appropriate subset of tuning knobs 138 may be performed in a variety of different manners, such as by implementing a machine learning environment in which the selection module 202 learns which knobs 138 are most correlated to particular performance metrics 140 under certain operating conditions, as will be explained in further detail below.

Once the input selection module 202 has identified the subset of tuning knobs 138, the selected knobs (138a, 138b in FIG. 2) are provided as inputs to the online control module 204 for adjustment of their values. The values of the knobs 138 that were not selected by the input selection module 202 (138c, 138d, 138e in FIG. 2) are not changed by the control system 200, and instead are simply provided as inputs to the computing system 100.

As will be explained in further detail below, the control module 204 uses feedback representative of the performance metrics 140 to adjust the value of the selected knobs 138. By dynamically adjusting the knobs 138 in this manner, desired performance metrics and/or QoS targets can be achieved as changes in the workload or operating conditions of system 100 occur.

Figure 3:
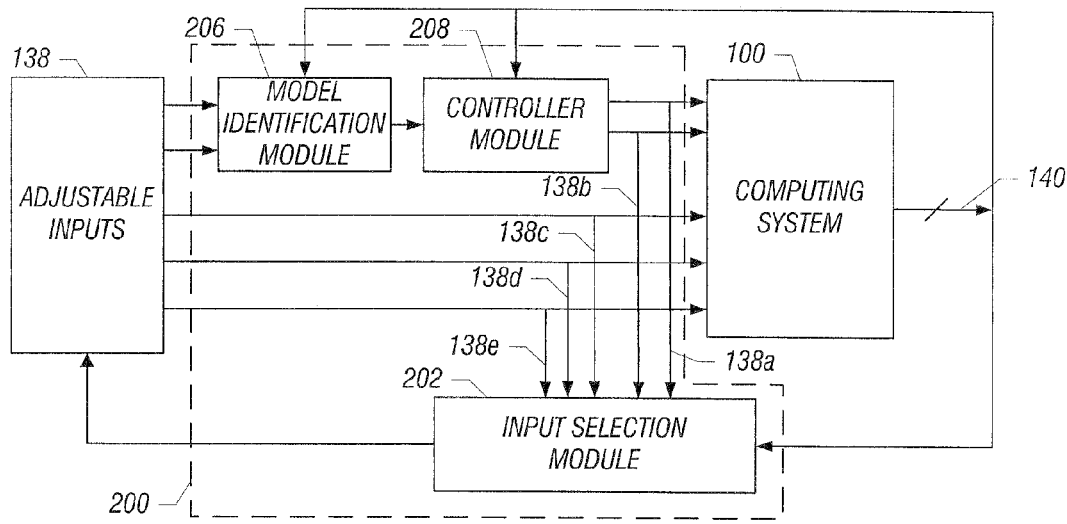
FIG. 3 is a block diagram of another exemplary control system, in accordance with an embodiment of the invention.

FIG. 3 illustrates an exemplary embodiment of the general architecture of the control system 200 shown in FIG. 2. In the embodiment of FIG. 3, the online control module 204 includes a model identification module 206 and a controller module 108. The model identification module 206 estimates an input-output model between the subset of inputs 138 that have been selected by the input selection module 202 and the output 140. In effect, the model identification module 206 generates a reduced model of the system 100 that correlates the selected inputs 138 with the output 140 of the computing system 100. Using this reduced input-output model, the controller module 208 dynamically adjusts the values of the selected inputs and provides the adjusted values for the subset of inputs 138 that have been selected to the computing system 100. In some embodiments, the input-output model is updated periodically, such as at preset intervals, each time that the input selection module 202 selects a new subset of inputs, etc.

In one embodiment of the invention, the input selection module 202 implements a statistical regression analysis to identify the subset of knobs that most affect the performance metrics under the present operating conditions. An exemplary tool for performing the regression analysis is LASSO, which is a shrinkage and selection method for linear regression that is well known in the art. More particularly, LASSO is a least squares method for choosing a linear model to predict a response variable. To illustrate, let $u_1, u_2, \ldots, u_m$ represent the covariates (i.e., the knobs), and y represent the response (i.e., the system output). In most instances, there is a large collection of possible covariates (i.e., m is large) from which a parsimonious set for the good prediction of the output is selected. Here, "goodness" is defined in terms of prediction accuracy. However, parsimony (i.e., a reduction in the number of inputs) is another criterion because simpler models provide better scientific insight into the input-output relationship and, thus, more robust controller designs.

LASSO minimizes the sum of squared errors between the measured output and the predicted output, with a bound on the sum of the absolute values of coefficients. As one skilled in the art would recognize, the following description of LASSO is not complete, but is intended only to provide an understanding on the manner in which selection of a subset of adjustable inputs may be achieved in the control system 200 shown in FIGS. 2 and 3.

More specifically, given a set of input measurements $u_1, u_2, \ldots, u_m$ and output measurement y, LASSO fits the following linear model to the data:

$$\hat{y} = \sum_{j=1}^{m} \hat{\beta}_j u_j. \tag{1}$$

LASSO assumes that the inputs (u) have zero mean and unit length, and that the output (y) has zero mean. This step is called "standardization", and it can be done through location and scale transformations on the raw data. Standardization is useful, since for real systems, different inputs (covariates) may have different meanings and units. Using a different unit may either magnify or reduce the coefficients' values. Hence in order to compare the effects of different inputs (i.e., knobs) on the output (i.e., performance metrics), the inputs should be standardized.

The criterion LASSO uses is the following constraint optimization:

$$\min\|y-\hat{y}\|^2 = \sum_{i=1}^{n}\left(y(i)-\sum_{j=1}^{m}\hat{\beta}_j u_j(i)\right)^2, \quad (2)$$

$$\text{s.t.} \sum_{j=1}^{m}|\hat{\beta}_j| \le t. \quad (3)$$

The sum in the objective function is taken over all observations in the dataset. The bound "t" in the constraint is a tuning parameter. When "t" is large enough, the constraint has no effect and the solution is just the usual linear least squares regression of y on $u_1, u_2, \ldots, u_m$. However, when smaller values of t (t>0) are used, the solutions are shrunken versions of the least squares estimates. Often, some of the coefficients $\hat{\beta}_j$ are zeros. Choosing "t" has the effect of choosing the number of predictors to use in a regression model, and cross-validation is a good tool for estimating the best value for "t".

The following example illustrates the effect of "t" on the resulting estimates $\hat{\beta}_j$.

Example: Consider an input-output linear system with 7 inputs and 1 output. The inputs are denoted as $u_1, \ldots u_7$, and the output is denoted as y. The system is governed by the equation below:

$$y(k+1) = 1.0u_1(k) + 0.1u_2(k) + 0.1u_3(k) + \\ 2.0u_4(k) + 0.1u_5(k) + 0.1u_6(k) + 5.0u_7(k) + e(k) \quad (4)$$

where e(k) represents a (white) noise disturbance.

In this example, system input-output data is collected through simulation. To this end, the system is excited using random inputs. Each system input is selected as a random number time sequence in [0,1]. The input noise e(k) is selected as a white noise with mean 0.005. A set of training data with a total of 500 input-output tuples is then selected. At instance k, the tuple is: $\{u_1(k), u_2(k), u_3(k), u_4(k), u_5(k), u_6(k), u_7(k), y(k+1)\}$.

Figure 4:
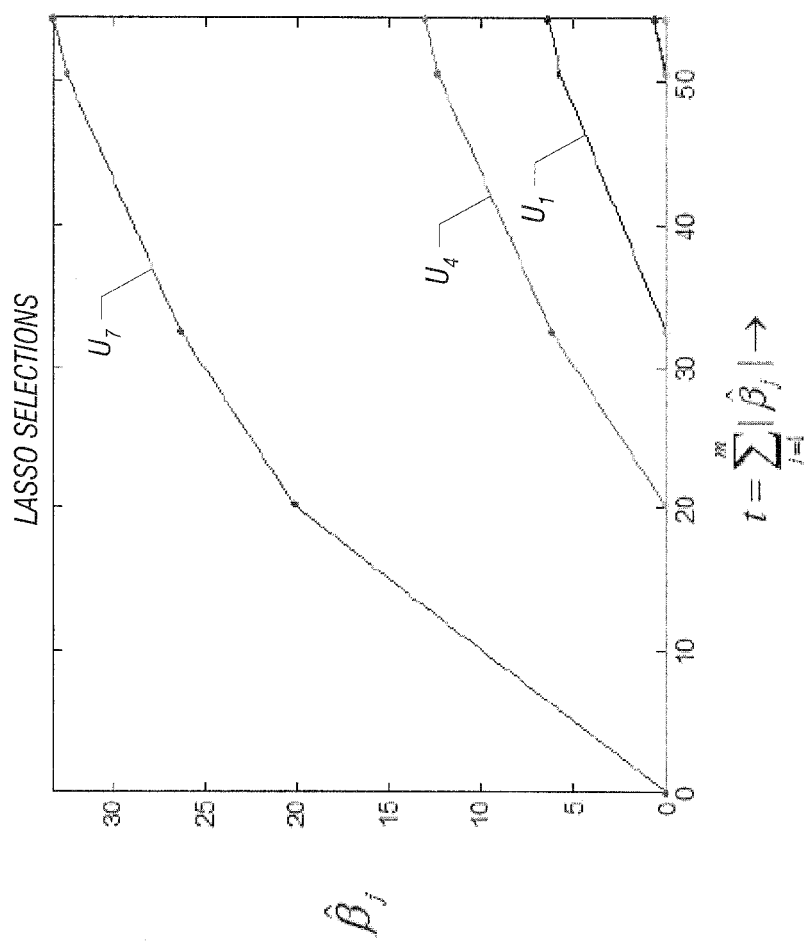
FIG. 4 is a graph illustrating the use of the LASSO technique implemented by the control system of FIG. 1, in accordance with an embodiment of the invention.

The LASSO method is then applied on the data collected. The tuning parameter "t" is varied from 0 to 55 and the resulting regression coefficient corresponding to each input is plotted. FIG. 4 shows the LASSO estimates $\hat{\beta}_j$ as a function of t. As can be seen from FIG. 4, the covariates enter the regression equation sequentially as t increases, in the order of j=7, 4, 1, ..., which corresponds to Equation (4), where the effect of different inputs on the response y is in decreasing order of $u_7$, $u_4, u_1, \ldots$.

In some embodiments, a variant of LASSO called LARS (Least Angle RegreSsion) may be used. As is known in the art and as shown in Efron et al, "Least Angle Regression," *Annal of Statistics*, vol. 32, pp. 407-499 (2004), for example, LARS is a computationally simpler method than LASSO that uses a simple mathematical formula to accelerate the computation of coefficients. Unlike LASSO, only m steps are required for the full set of solutions, where m is the number of covariates.

The following illustrates the performance in terms of prediction accuracy for the above open-loop system (i.e., without control) using LASSO/LARS. In this example, among the m=7 inputs, only n (n<m) inputs are selected to predict the response y. The number of n is varied from 1 to 3, and the sum of squared errors and the $r^2$ measure are calculated. The higher the $r^2$ value, the more accurate the prediction is. Table 1 summarizes when n is chosen from 1 to 3, the corresponding reduced input(s) selected by LARS. Table 1 also shows the sum of squared errors between the measured system output y and model-predicted (with reduced input) output and the corresponding $r^2$ measure.

TABLE 1

Selected input subsets v.s. n and their prediction performance

| n | LARS selected inputs | Sum of squared errors | $r^2$ measure |
|---|---|---|---|
| 1 | {$u_7$} | 360.01 | 0.73 |
| 2 | {$u_7, u_4$} | 131.76 | 0.90 |
| 3 | {$u_7, u_4, u_1$} | 2.09 | 0.998 |

From the results, it can be seen that the LASSO/LARS-based knob selection method can select the most appropriate (i.e., best possible) subset of knobs that affect the system output the most. Also, when more knobs are selected, the prediction of the system response becomes more accurate.

Once the subset of control inputs has been selected by the input selection module 202 (such as by implementing the LASSO/LARS technique), an input-output model that represents the dynamics of the computing system 100 with reduced inputs is generated by the model identification module 206. In one embodiment of the module 206, the dynamics of the system 100 may be characterized by the following linear auto-regressive-moving-average (ARMA) model:

$$A(q^{-1})y(k+1)=B(q^{-1})u(k)+e(k), \quad (5)$$

where $A(q^{-1})$ and $B(q^{-1})$ are matrix polynomials in the backward-shift operator:

$$A(q^{-1})=I-A_1 q^{-1}-\ldots-A_n q^{-1},$$

$$B(q^{-1})=B_0 q^{-1}+\ldots+B_{n-1}q^{-1}, \quad (6)$$

and n is the order of the system. $\{e(k)\}$ is a sequence of independent, identically distributed random vectors with zero means. It is further assumed that e(k) is independent of y(k−j) and u(k−j) for j>0. $\{e(k)\}$ is used to represent disturbances or noises in the system that are not accounted for by the model.

For computing systems, the system order n is usually fixed and low and can be estimated offline. However, the values of the coefficient matrices $A_i$ and $B_j$, where 0<i<n and 0<j<n, are likely to vary in a typical computing system due to changes in system operating conditions and workload dynamics. To account for these variations, the model generated by the model identification module 206 is periodically re-estimated, such as by using the Recursive Least Squares (RLS) method with exponential forgetting.

For notational convenience, the input-output model of the system 100 can be written in the following RLS-friendly form.

$$y(k+1)=X(k)\phi(k)+e(k+1), \quad (7)$$

$$\phi(k)=[u^T(k),\ldots,u^T(k-n+1),y^T(k),\ldots,y^T(k-n+1)]^T, \quad (8)$$

$$x=[B_0,\ldots B_{n-1},A_1,\ldots A_n]. \quad (9)$$

For every control interval k, the value of X(k) is re-estimated, which will be used by the controller module 208, as will be discussed below.

In one embodiment of the controller module 208, the goal is to minimize the following quadratic cost function:

$$J=\|W(y(k+1)-y_{ref}(k+1))\|^2+(\|Q((k)-u(k-1))\|^2) \quad (10)$$

where W is a weighting matrix on the tracking errors and Q is a weighting matrix on the changes in the input values.

The goal of the controller module 208 is to steer the computing system 100 into a state of optimum reference tracking with minimum variance, while penalizing large changes in the input values. For computing systems, a large change in an input value is not desirable, since it may result in large oscillations in the system. The W and Q weighting matrices are commonly chosen as diagonal matrices. Their relative magnitude provides a way to trade off tracking accuracy for system stability.

The minimization should be over the set of all admissible controllers, where a controller is admissible if each control action u(k) is a function of vector Φ(k−1) and of the new measurement y(k). An optimal controller may be derived by explicitly capturing the dependency of the cost function J on u(k):

$$\tilde{\phi}(k)=[0,u^T(k-1),\ldots,u^T(k-n+1),y^T(k),\ldots y^T(k-n+1)]^T \quad (11)$$

The simplicity of the cost function allows for the following closed-form expression for the optimal control law, which can be implemented in the controller module 208:

$$u^*(k) = \left((W\hat{B}_0)^T W\hat{B}_0 + Q^T Q\right)^{-1}\left[(W\hat{B}_0)^T W(y_{ref}(k+1) - \hat{X}(k)\tilde{\phi}(k)) + Q^T Qu(k-1)\right] \quad (12)$$

Figure 5:
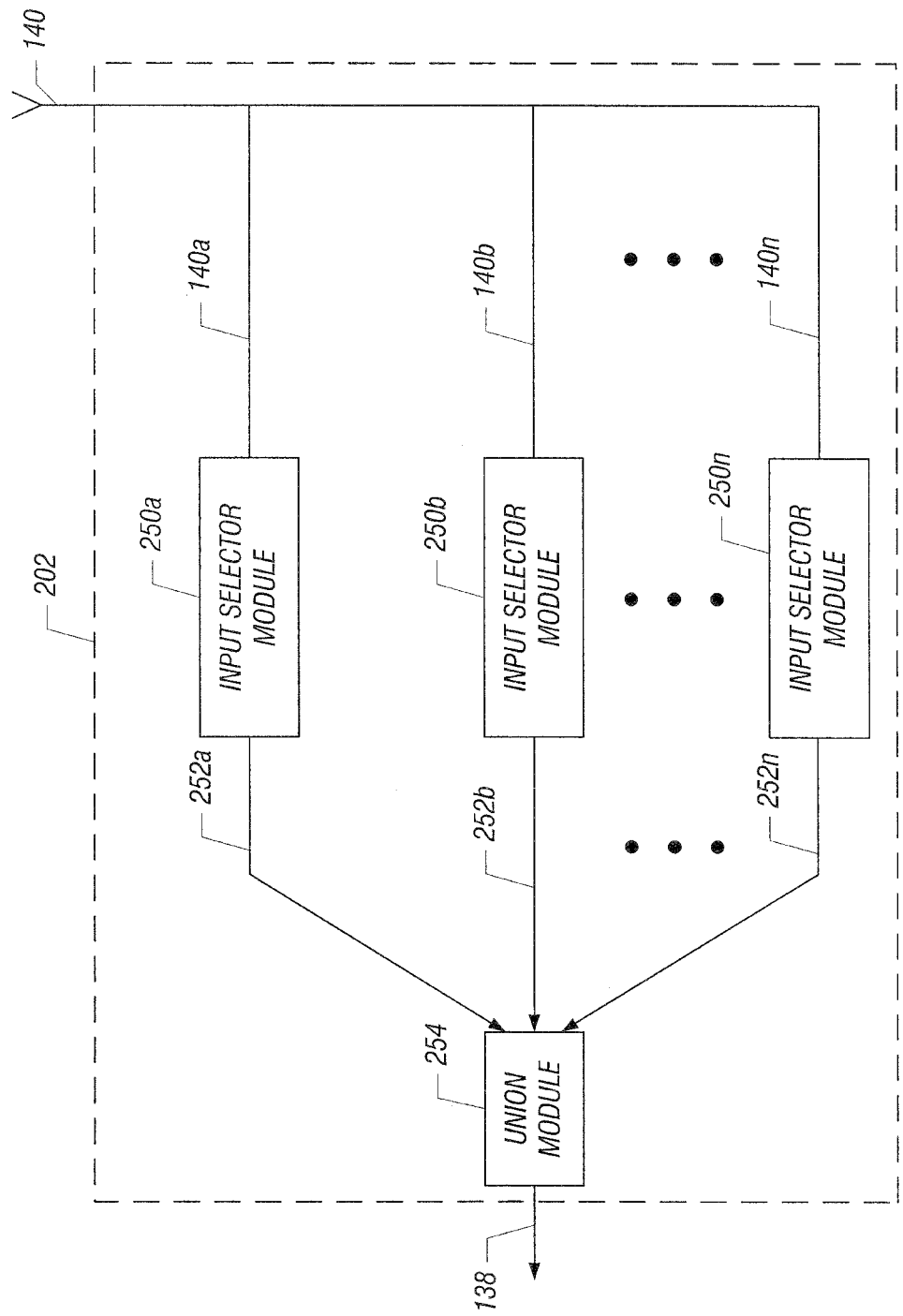
FIG. 5 is an exemplary embodiment of the input selection module of FIGS. 2 and 3 which uses the LASSO technique, in accordance with an embodiment of the invention.

FIG. 5 illustrates an exemplary embodiment of the input selection module 202 which implements the LASSO regression method to analyze multiple output metrics 140a-n. In this embodiment, each output 140a-n is provided to an input selector module 250a-n, each of which is configured to implement LASSO to select a subset of inputs 252a-n for each output metric 140a-n, respectively. The union of the subsets 252a-n is then determined by a union module 254 to generate the subset of inputs 138 for the system 100. It should be understood that the LASSO regression method is just one exemplary technique for selecting a subset of inputs 138 based on observation of the output metrics 140 and that, in other embodiments, the input selection module 202 may be configured as appropriate to implement other types of input selection algorithms.

Figure 6:
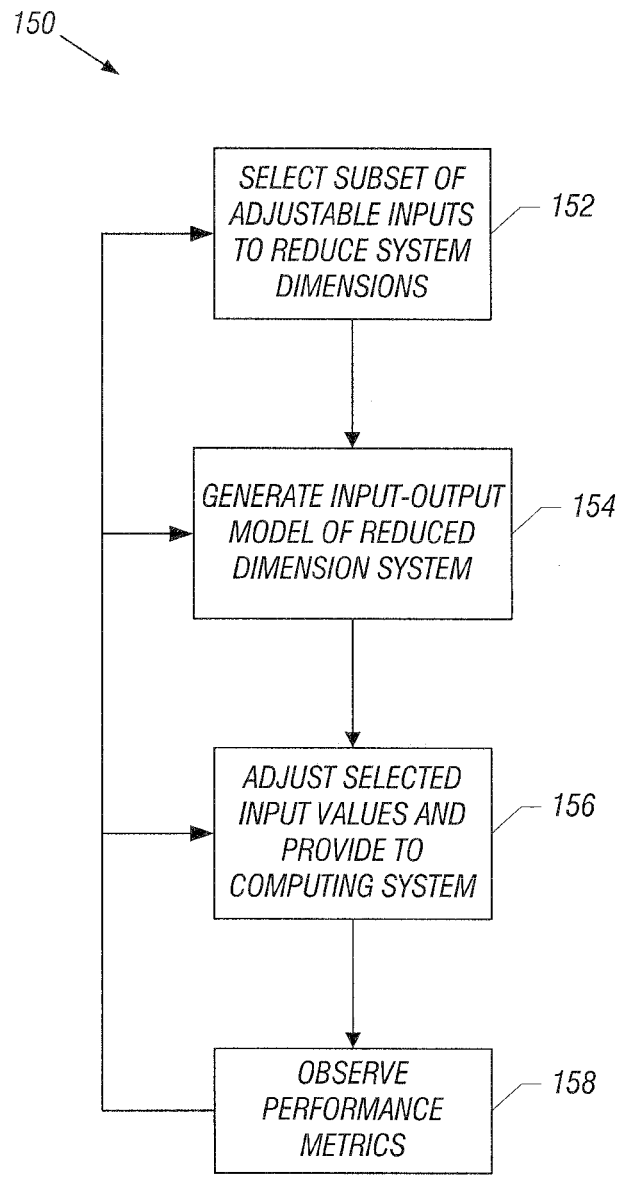
FIG. 6 is a flow diagram of an exemplary control technique implemented by the control system of FIG. 1, in accordance with an embodiment of the invention.

An exemplary control technique 150 implemented by the control system 200 to control the output of the computing system 100 is illustrated in the flow diagram of FIG. 6. In response to observing the performance metrics (block 158) of the computing system 100, a subset of the adjustable inputs 138 to the system 100 are selected (block 152) to reduce the dimension of the system 100. An input-output model of the reduced system 100 which represents the relationship between the selected subset of inputs 138 and the performance metrics 140 is then generated (block 154). Using the reduced input-output model, the values of the selected adjustable inputs are adjusted and provided to the computing system 100 (block 156). Observation of the performance metrics 140 continues (block 158), which may lead to selection of a new subset of adjustable inputs (return to block 152). It should be understood that technique 150 may include different or additional steps other than those specifically illustrated in the flow diagram of FIG. 5.

Instructions of software described above (including technique 150 of FIG. 5) are loaded for execution on a processor (such as one or more CPUs 210 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more computer-readable or computer-usable storage media (such as a memory 212 shown in FIG. 1). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The tasks of FIG. 6 may be provided in the context of information technology (IT) services offered by one organization to another organization. For example, the infrastructure (including the physical machines and virtual machines of FIG. 1) may be owned by a first organization. The IT services may be offered as part of an IT services contract, for example.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of controlling an output of a computing system, comprising:
   providing, via a processing system, a set of adjustable inputs to the computing system;
   observing, via the processing system, while in operation, performance metrics associated with an output of the computing system;
   identifying, via the processing system, adjustable inputs from the set of adjustable inputs which most affect at least a selected one of the performance metrics, the identifying comprising applying a statistical analysis to the observed performance metrics to identify the adjustable inputs; and
   adjusting, via the processing system, while in operation, only the identified adjustable inputs to achieve a desired value of the at least selected one perfbrrnance metric without adjusting the adjustable inputs that are not identified but are provided to the computing system.

2. The method as recited in claim 1, wherein identifying the adjustable inputs is further based on observing, via the processing system, a response of the output of the computing system to adjustment of the provided adjustable inputs.

3. The method as recited in claim 1, further comprising:
   generating via the processing system, a reduced input-output model of the computing system using the identified adjustable inputs; and
   adjusting the identified adjustable inputs based on the reduced input-output model.

4. The method as recited in claim 3, further comprising:
   periodically updating the reduced input-output model via the processing system.

5. The method as recited in claim 3, further comprising:
identifying, via the processing system, a new subset of adjustable inputs in response to a change of the output; and
re-generating, via the processing system, the reduced input-output model using the new subset of adjustable inputs.

6. The method of claim 1, further comprising providing information technology services via the processing system, wherein the observing task, the identifying task, and the adjusting task are part of the information technology services.

7. A system for dynamically controlling an output of a computing system having a plurality of adjustable inputs, comprising:
an input selection module to dynamically identify, via a processor, a subset of adjustable inputs from a plurality of adjustable inputs that are provided to a computing system in response to observation of performance metrics associated with an output of the computing system while the computing system is in operation, wherein the input selection module applies a statistical analysis to identify which adjustable inputs of the set of adjustable inputs most affect at least a selected one of the performance metrics while the computing system is in operation; and
a control module coupled to the input selection module and configured to adjust, via the processor, only the adjustable parameters in the identified subset to achieve a desired value of the at least one performance metric.

8. The system as recited in claim 7, wherein the control module comprises a model identification module to generate, via the processor, an input-output model of the computing system based on the identified subset.

9. The system as recited in claim 8, wherein the model identification module periodically regenerates the input-output model via the processor.

10. The system as recited in claim 7, wherein the input selection module implements, via the processor, a statistical regression analysis to determine which adjustable inputs have the most affect on the at least one performance metric.

11. The system as recited in claim 7, wherein the computing system is a shared server system.

12. The system as recited claim 11, wherein the plurality of adjustable inputs includes at least one of an application-level parameter and a system-level parameter.

13. The system as recited in claim 7, wherein the input selection module identifies, via the processor, the adjustable inputs that most affect the at least selected one of the performance metrics in response to an observed change in the output of the computing system to adjustment of the plurality of provided adjustable inputs.

14. The system as recited in claim 13, wherein the model identification module regenerates, via the processor, the input-output model based on the new subset of the adjustable inputs.

15. An article comprising at least one non-transitory computer-readable storage medium containing instructions that when executed by a processor-based system cause the processor-based system to:
observe performance metrics associated with an output of a computing system during operation of the computing system, the computing system having a plurality of adjustable inputs;
identify a subset of adjustable inputs of the plurality of adjustable inputs which most affect at least one of the performance metrics, the identification comprising applying a statistical analysis, during operation of the computing system, to identify the subset of adjustable inputs;
generate an input-output model of the computing system based on the determined subset of adjustable inputs; and
use the input-output model to adjust, during operation of the computing system, only the adjustable inputs in the determined subset to achieve a desired output of the computing system without adjusting the adjustable inputs of the computing system that are not in the determined subset.

16. The article of claim 15, the storage medium storing instructions that when executed by the processor-based system cause the processor-based system to identify the subset of adjustable inputs based on an observation of a response of the output of the computing system to adjustment of the plurality of adjustable inputs.

* * * * *